United States Patent
Plaster

(10) Patent No.: US 8,255,018 B2
(45) Date of Patent: Aug. 28, 2012

(54) GLOBAL POSITIONING SYSTEM (GPS) ENABLED APPARATUS FOR CARRYING OBJECTS AND METHOD THEREFOR

(76) Inventor: Morgan J. Plaster, Las Vegas, NV (US)

( * ) Notice: Subject to any disclaimer, the term of this patent is extended or adjusted under 35 U.S.C. 154(b) by 345 days.

(21) Appl. No.: 12/683,624

(22) Filed: Jan. 7, 2010

(65) Prior Publication Data

US 2010/0141434 A1   Jun. 10, 2010

Related U.S. Application Data

(63) Continuation-in-part of application No. 11/398,140, filed on Apr. 4, 2006, now abandoned.

(51) Int. Cl.
 *H04M 1/00* (2006.01)
(52) U.S. Cl. .......... 455/575.1; 455/90.3; 455/128; 455/404.2; 340/686.6
(58) Field of Classification Search ............. 455/575.1, 455/90.3, 128, 404.2, 404.1, 412.2, 414.1, 455/414.2; 379/330, 428.01, 447; 340/686.6, 340/539.21
See application file for complete search history.

(56) References Cited

U.S. PATENT DOCUMENTS

| | | | |
|---|---|---|---|
| D499,091 S * | 11/2004 | Taylor et al. | D14/252 |
| 7,535,357 B2 * | 5/2009 | Enitan et al. | 340/571 |
| 2003/0218445 A1 * | 11/2003 | Behar | 320/114 |
| 2007/0096933 A1 * | 5/2007 | Enitan et al. | 340/686.6 |
| 2010/0045455 A1 * | 2/2010 | Mazzolini et al. | 340/521 |

\* cited by examiner

*Primary Examiner* — Minh D Dao
(74) *Attorney, Agent, or Firm* — Weiss & Moy, P.C.; Jeffrey D. Moy

(57) ABSTRACT

An apparatus for holding an object has a holding piece for holding the object. A locating device is coupled to the holding piece.

18 Claims, 4 Drawing Sheets

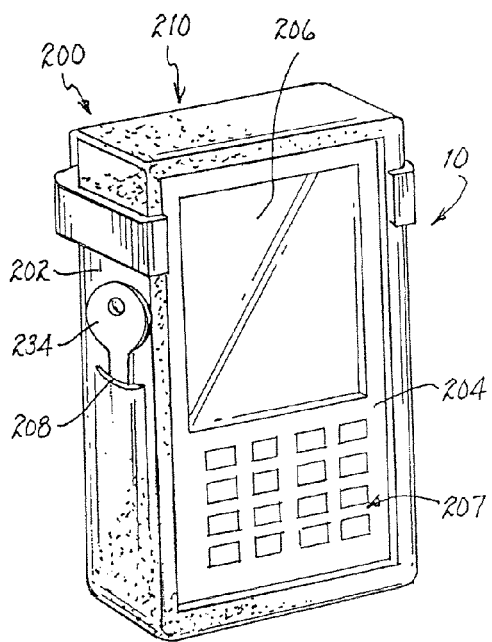
FIG. 11
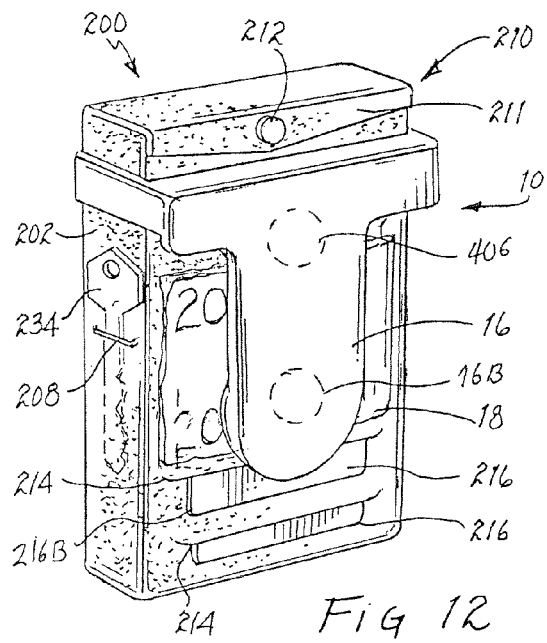
FIG. 12
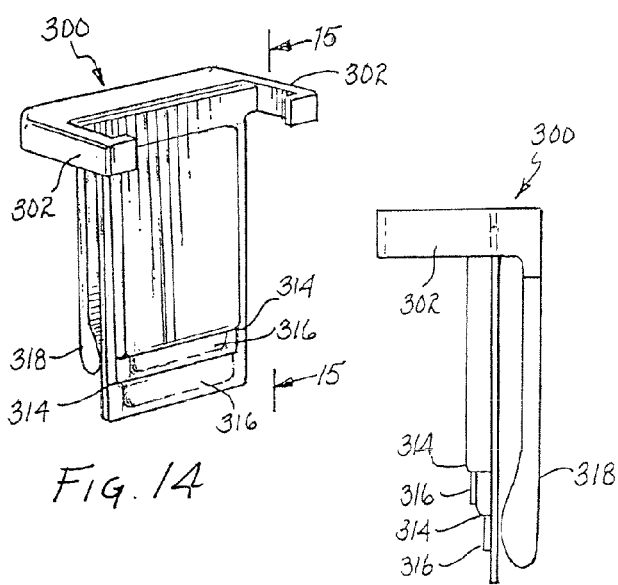
FIG. 14
FIG. 15
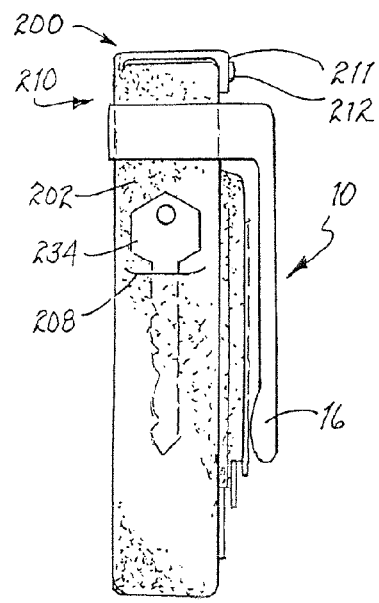
FIG. 13

GLOBAL POSITIONING SYSTEM (GPS) ENABLED APPARATUS FOR CARRYING OBJECTS AND METHOD THEREFOR

RELATED APPLICATIONS

The present application is a continuation-in-part of U.S. patent application having Ser. No. 11/398,140, filed Apr. 4, 2006 now abandoned and entitled "MOBILE-PHONE MUNTED APPARATUS AND METHOD FOR CARRYING PERSONAL OBJECTS" and filed in the name of the same inventor.

FILED OF THE INVENTION

This invention relates to a device for carrying personal objects, and more particularly, to device for carrying personal objects and or items that has a locating device to aid in tracking the device when misplaced, lost or stolen.

BACKGROUND OF THE INVENTION

A money clip is a device typically used to store cash and or credit cards in a very compact fashion for those who do not wish to carry a wallet. Money clips may be formed of a solid piece of material which is folded, such that the bills and credit cards are securely wedged in between the fold. Money clips are typically formed of a metal such as stainless steel, silver, gold, titanium, or platinum. One problem with current money clips is that they have a tendency to get lost. Due to the compact nature of money clips, the money clips have a tendency to fall out of the pockets of the user. Because of this, money clips are easily misplaced. Lost or stolen.

Mobile or "cell" telephones have in recent years achieved extremely wide levels of use in the U.S. and indeed in countries throughout the world. It is typical for persons to carry mobile phones with them throughout their work or school days. Mobile phones may be carried in a pocket, in a purse, or clipped to a belt. There are other objects that a person may typically need to carry when out of the house. These may include but are not limited to keys, credit cards, a driver's license, and folding money.

Therefore, a need existed to provide a system and method to overcome the above problems.

SUMMARY OF THE INVENTION

An apparatus for holding an object has a holding piece for holding the object. A locating device is coupled to the holding piece.

The present invention is best understood by reference to the following detailed description when read in conjunction with the accompanying drawings.

BRIEF DESCRIPTION OF THE DRAWINGS

FIG. 11 is a front perspective view of a mobile-phone mounted personal object carrying apparatus, consistent with an embodiment of the present invention;

FIG. 12 is a rear perspective view of a mobile-phone mounted personal object carrying apparatus, consistent with an embodiment of the present invention;

FIG. 13 is a side view of the mobile-phone mounted personal object carrying apparatus of FIG. 11;

FIG. 14 is a perspective view of a mobile-phone mounted personal object carrying apparatus, consistent with an embodiment of the present invention;

FIG. 15 is a side view of the mobile-phone mounted personal object carrying apparatus of FIG. 14;

Common reference numerals are used throughout the drawings and detailed description to indicate like elements.

DETAILED DESCRIPTION

Figure 1:
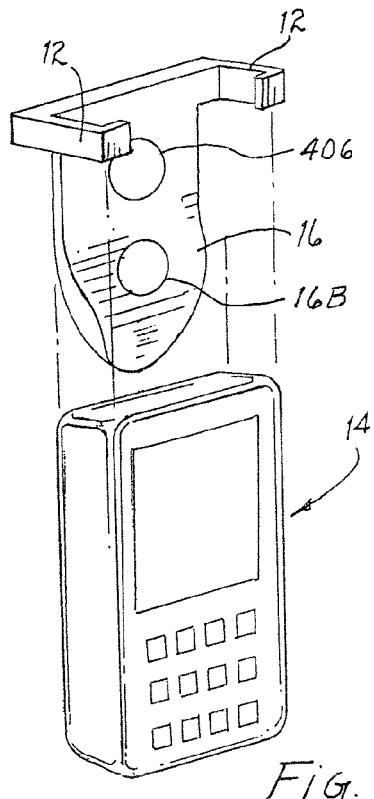
FIG. 1 is a perspective view of a mobile-phone mounted personal object carrying apparatus, consistent with an embodiment of the present invention.
Figure 2:
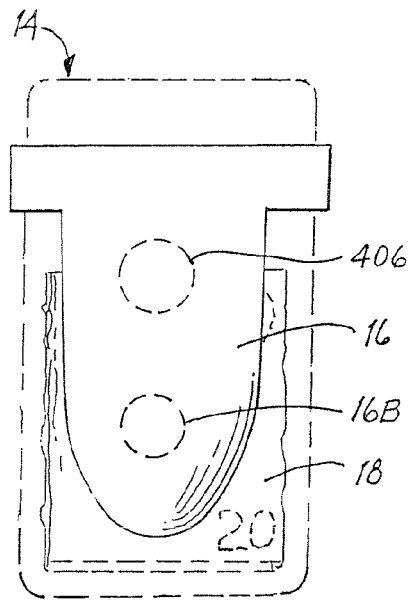
FIG. 2 is a rear view of the apparatus of FIG. 1.
Figure 3:
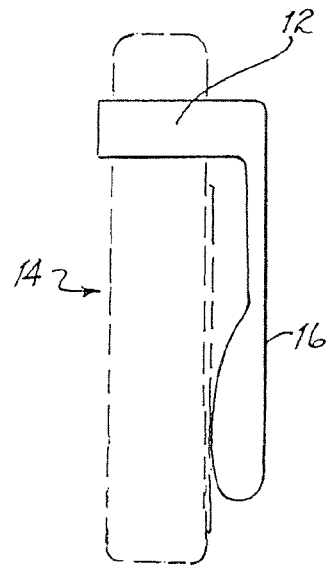
FIG. 3 is a side view of the apparatus of FIG. 1.

Referring first to FIGS. 1-3, an embodiment of a personal object carrying apparatus 10 (hereinafter 'apparatus 10') of the present invention is shown. In this embodiment, the apparatus 10 comprises coupling device 12, which may be used to hold a device such as a mobile phone 14 or the like. In accordance with one embodiment, the coupling device 12 may be substantially L-shaped arms as shown herein. However, different coupling devices may be used without departing from the spirit and scope of the present invention. The coupling device 12 couples the apparatus 10 to a mobile phone 14 or other device. The apparatus 10 further comprises a tongue 16, which extends downward from the coupling means 12.

As best shown in FIG. 3, when the apparatus 10 is in position on a mobile phone 14, the tongue 16 contacts a rear, relatively end portion of the mobile phone 14. As can best be seen by reference to FIG. 2, when coupled to a mobile phone 14, apparatus 10 acts as money clip, with an item of paper currency 18 being held between the tongue 16 and rear portion of the mobile phone 14.

Inserted in a cavity 16A of the tongue 16 is a tracking device 16B. The tracking device 16B may be used to locate the apparatus 10 when the apparatus 10 is lost, stolen, and or misplaced. The tracking device 16B may be a Global Positional Satellite (GPS) device, a Radio Frequency Identification Device (RFID), or the like.

Figure 4:
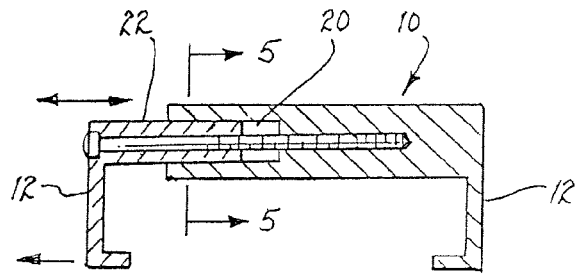
FIG. 4 is a top, cross-sectional view of an adjustable mobile-phone mounted personal object carrying apparatus, consistent with an embodiment of the present invention.
Figure 5:
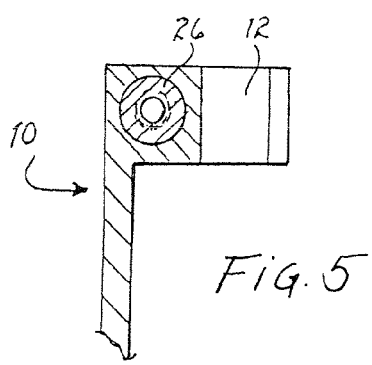
FIG. 5 is a side view of the apparatus of FIG. 4.

Referring now to FIGS. 4-5, the apparatus 10 may be adjustable to accommodate different size objects. Mobile phones 14 do not come in uniform sizes. For examples, some mobile phones 14 are relatively wider than others. In the embodiment of FIGS. 4-5, the space between coupling device 12 is adjustable. The feature of adjustability is achieved, in this embodiment, by providing a female receiving section 20 coupled to (or continuous with) a first coupling means 12A, and a male insertion section 22 coupled to (or continuous with) a second coupling means 12B. A threaded bolt 24 is inserted through the male insertion section 22, and threadably retained within the female receiving section 20. Rotation of the bolt 24 about knob 26 adjusts the length of penetration of the insertion section 22 into the receiver section 20, and thus the distance between the first and second coupling means 12.

Inserted in a cavity of the tongue 16 is a tracking device 16B. The tracking device 16B may be used to locate the apparatus 10 when the apparatus 10 is lost, stolen, and or misplaced. The tracking device 16B may be a Global Positional Satellite (GPS) device, a Radio Frequency Identification Device (RFID), or the like.

Referring now to FIGS. 6-9, another embodiment of a mobile-phone mounted personal object carrying apparatus, herein referred to as an apparatus 100, is shown. In this embodiment, the apparatus 100 comprises coupling means 112, which may be substantially L-shaped arms as shown herein or which may have a different coupling configuration. As described above with respect to the apparatus 10, the coupling means 112 couple the apparatus 100 to a mobile phone 14 or other device. The apparatus 100 may further comprise a tongue 116, which extends downward from the coupling means 112. It may be desired to configure the tongue 116 so that it may act as a money clip, in the manner described above with respect to the apparatus 10.

Figure 10:
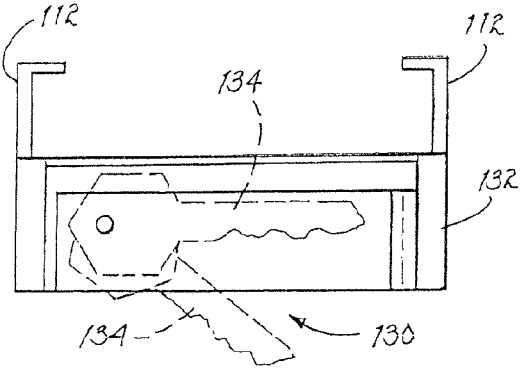
FIG. 10 is a top view of the upper portion of the mobile-phone mounted personal object carrying apparatus of FIG. 6.

Attention is now directed to the upper portion of the apparatus 100. In one embodiment, a key case 130 is provided. The key case 130 generally comprises a housing 132, which is sized to accommodate a plurality of keys 134. The key case 130 may further comprise a post 136 located within the housing 132, and onto which keys 134 may be positioned (see especially FIG. 8). In one embodiment, the rearmost side of the housing 132 (as viewed when the apparatus 100 is mounted on a mobile phone 14) is open, so that keys 134 may be rotated about the post 136 for use. See, e.g., FIG. 10.

Inserted in a cavity of the tongue 116 is a tracking device 116B. The tracking device 116B may be used to locate the apparatus 100 when the apparatus 100 is lost, stolen, and or misplaced. The tracking device 116B may be a Global Positional Satellite (GPS) device, a Radio Frequency Identification Device (RFID), or the like.

Figure 6:
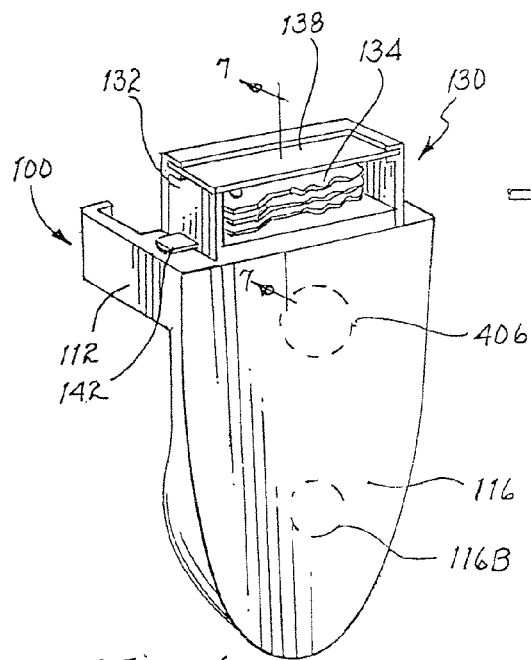
FIG. 6 is a perspective view of a mobile-phone mounted personal object carrying apparatus, consistent with an embodiment of the present invention.
Figure 7:
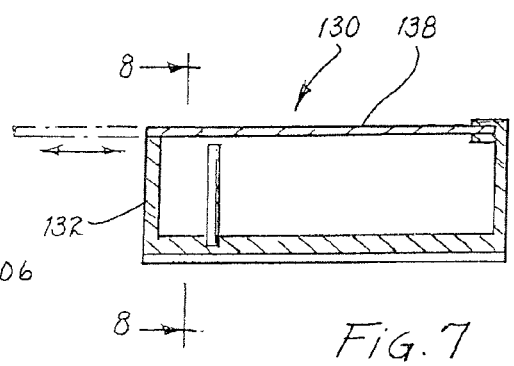
FIG. 7 is a front view of an upper portion of the mobile-phone mounted personal object carrying apparatus of FIG. 6.

Referring now to FIGS. 6-7, in one embodiment, the housing 132 further comprises a slidably-mounted cover 138. The cover 138 may be removed from the housing 132, or installed thereon, through a sliding motion, as best seen in FIG. 7.

Figure 8:
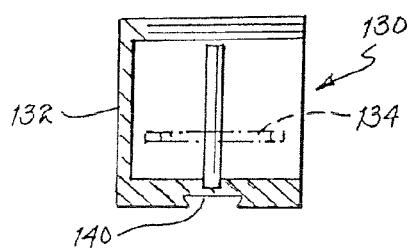
FIG. 8 is an end view of the upper portion of the mobile-phone mounted personal object carrying apparatus of FIG. 6.
Figure 9:
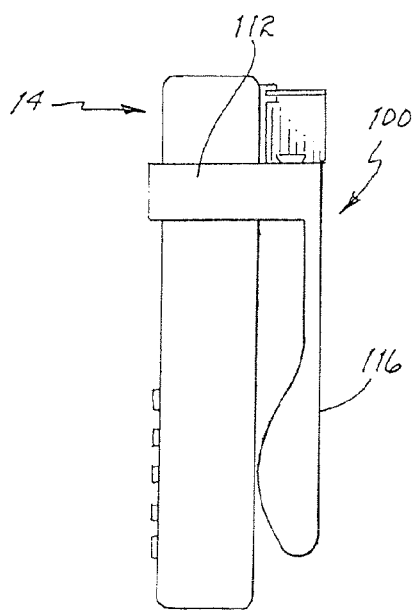
FIG. 9 is a side view of the mobile-phone mounted personal object carrying apparatus of FIG. 6.

It may be desired to affix the key case 130 to the apparatus 100 in a more or less permanent fashion. Alternatively, it may be desired to make the key case 130 separable from the remainder of the apparatus 100. Referring specifically to FIGS. 6 and 8, in one embodiment, a groove 140 is provided in the underside of the key case 130, which slidably mates with raised area 142 on an upper portion of the apparatus 100. In this configuration, a user desiring to access on or more keys 134 could first remove the key case 130 by sliding it off of the raised area 142, and thereafter could return the key case 130 to the upper portion of the apparatus 100 by positioning the groove 140 so that it receives the raised area 142 therein as the key case 130 is slid into position along the upper portion of the apparatus 100.

It should be noted that the use of a mating raised area 142 and groove 140 represents only one means for removably coupling the key case 130 to the apparatus 100. Other means, such as hook and loop material, could also be utilized, as desired.

In this embodiment, the tracking device 116B may be inserted in a cavity of the tongue 116. However, it may also be inserted in a cavity of the cover 138 of key case 130 or in other areas of the key case 130. This would allow one to track and locate the key case 130 and or the key case and the apparatus 100 if misplaced, lost and or stolen. The tracking device 116B may be a Global Positional Satellite (GPS) device, a Radio Frequency Identification Device (RFID), or the like.

Referring now to FIGS. 11-13, another embodiment of a mobile phone-mounted objecting holding apparatus is shown, hereinafter referred to as "apparatus 200." The apparatus 200 comprises a casing 202, into which may be inserted a mobile phone 14. Insertion may be through an opening in the bottom portion (not shown) of the casing 202, or otherwise as desired.

On a first side, the casing 202 may have a substantially transparent surface 204, such as one comprised of a clear plastic, to permit a user to see a screen 206 and keyboard 207 of the mobile phone 14. On at least one side of the casing 202, a key pocket 208 may be provided, which is configured to accommodate at least the shaft portion of a key 234. In one embodiment, the head portion of the key 234 protrudes from the key pocket 208, to facilitate removal and reinsertion of the key 234. It may be desired to provide a key pocket 208 on each side of the casing 202.

Referring now to an upper portion of the casing 202, it may be desired to provide a housing 210 thereon. The housing 210 may be desired to carry certain personal objects, including for example one or more keys 234 (not shown), coins, earrings, or other similarly-sized objects. In one embodiment, as for example shown in FIGS. 11-13, the housing 210 has a lid 211 which may be securely closed in position with a snap type closure 212. However, it should be noted that other closing means may be utilized, including for example hook and loop closing means.

In this embodiment, the tracking device 216B may be inserted in a cavity of the apparatus 200 or in other areas of the apparatus 200. This would allow one to track and locate the apparatus 200 if misplaced, lost and or stolen. The tracking device 116B may be a Global Positional Satellite (GPS) device, a Radio Frequency Identification Device (RFID), or the like.

Referring more specifically to FIGS. 12-13, in one embodiment, apparatus 10 may be secured to the casing 202. As shown in FIGS. 12 and 13, when the apparatus 10 is in position on the casing 202, the tongue 16 contacts a rear, relatively end portion of the casing 202. In this configuration, apparatus 10 acts as a money clip, with an item of paper currency 18 being held between the tongue 16 and rear portion of the casing 202.

Still referring to FIGS. 12-13, at least one and preferably a plurality of externally-accessible card pockets 214 may be provided on a rear side of the casing 202. In one embodiment, as shown in these figures, the card pockets 214 are open at an underside thereof, so that a user may withdraw a card 216 located therein without the need to remove the apparatus 10. (The card 216 may be, for example, a driver's license, credit card, business card, etc.) As also shown in these figures, where more than one card pocket 214 is provided, it is preferred that the openings be at different levels, so that a user may conveniently remove a first card 216 located in a first card pocket 214 without disturbing a second card located in a second card 216 pocket 214.

Referring now to FIGS. 14-15, another embodiment of a mobile phone-mounted objecting holding apparatus is shown, hereinafter referred to as "apparatus 300." The apparatus 300 may utilize first and second coupling means 302 to clasp the exterior of a mobile phone 14. The apparatus 300 may further comprise a one or a plurality of card pockets 314, into each of which one or more cards 316 may be inserted. Still further, the apparatus 300 may include a downward protruding tongue 318, which is positioned so that a portion thereof contacts a rear side of a pocket 314. The tongue 318 is thereby configured to act as a money-clip, and to secure an item of paper money (not shown) between the tongue 318 and the rear side of the card pocket 314.

In this embodiment, the tracking device 116B may be inserted in a cavity 116C of the tongue 318. This would allow one to track and locate the apparatus 300 if misplaced, lost and or stolen. The tracking device 116B may be a Global Positional Satellite (GPS) device, a Radio Frequency Identification Device (RFID), or the like.

Figure 16:
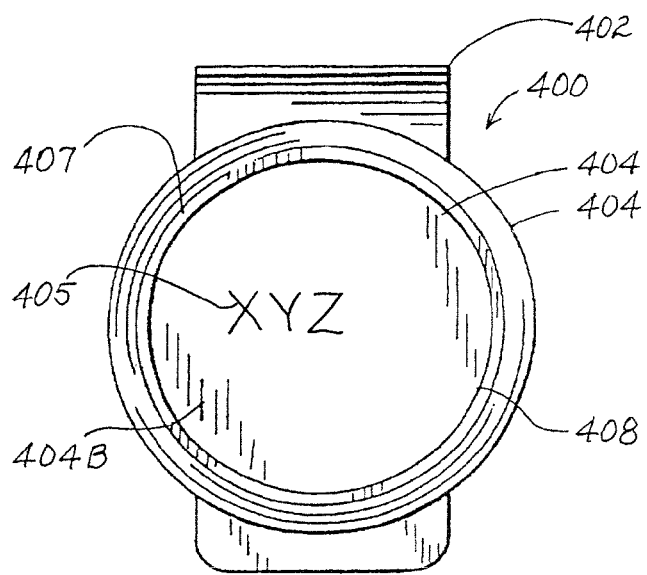
FIG. 16. Is a front view of another embodiment of the present invention.
Figure 17:
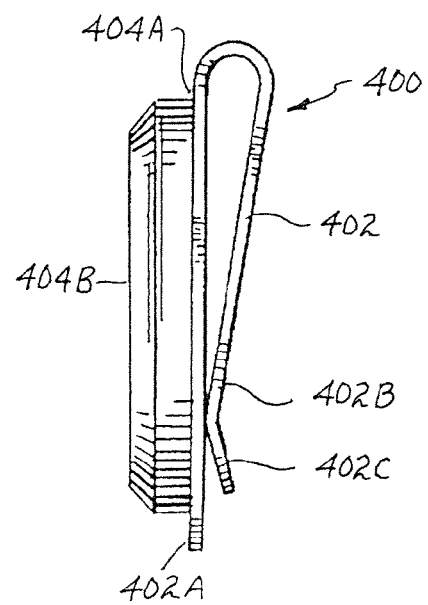
FIG. 17 is a side view of the embodiment shown in FIG. 16.

Referring now to FIGS. 16-17, another embodiment of the present invention is shown. In this embodiment, the apparatus 400 for holding objects and the like has a holding member 402. The holding member 402 may be a clip or the like. In the embodiment shown in FIGS. 16 and 17, the holding member 402 may be formed of a folded and or bent piece of material wherein one end 402A is folded and may be in contact with the a second end section 402B of the holding member 402. Bills, credit cards, and the like may be positioned between the end 402A and the end section 402B and securely wedged in between the fold. A lip 402C may be formed on the end of the second end section 402B. The lip 402C provides for easy entry of objects such as money, credit cards, papers, or the like between the fold.

A housing 404 may be coupled to the holding member 402. In the present embodiment, the housing 404 is a circular disk. However, the housing 404 may be other shapes and or sizes without departing from the spirit and scope of the present invention.

The housing 404 has a first surface 404A which may be coupled to the holding member 402. The housing 404 may be used for different purposes. For example, the connector 404 may be used as an identifying device. In the present embodiment, a second surface 404B of the housing 404 may have identifying indicia 405 such has the initials of the owner, a unique symbol, or the like that the owner may use to identify the apparatus 400. The housing 404 may further be used to couple the apparatus 400 to one of the apparatus of the previous embodiments. Thus, the housing 404 may be coupled to the apparatus 10, 100, 200 and 300 or to any other type of mobile phone holder.

The housing 404 may be coupled to the apparatus 10, 100, 200 and 300 or to any other type of mobile phone holder (hereinafter mobile phone holder) in many different manners. For example, the housing 404 may be coupled to a connector 406 on the mobile phone holder. Alternatively, the housing 404 may be metallic and thus coupled to a connector 406 which is magnetized on the mobile phone holder). Other coupling devices may be used to attach the housing 404 to a mobile phone holder without departing from the spirit and scope of the present invention.

Located in a cavity 407 of the housing 404 may be a locating device 408. The locating device 408 may allow one to track and locate the apparatus 400 if misplaced, lost and or stolen. The tracking device 408 may be a Global Positional Satellite (GPS) device, a Radio Frequency Identification Device (RFID), or the like.

The locating device 408 may work in several different manners. For example, the user may have a program loaded on a mobile phone that may be used to locate the locating device 408. The program may be used to activate the locating device 408 and then track the locating device 408 once activated. Alternatively, the locating device 408 may be activated and tracked by a third party monitoring company. In another embodiment, the locating device 408 may respond to the owner's voice or other sound. Upon hearing a predetermined sound, the locating device 408 may send an audible or visual signal to help the owner locate the locating device 408. For example, the owner may clap his/her hands or say and or yell a code word. Upon hearing the hand clap or code word, the locating device may activate a flashing light or send an audible signal. The above are given as examples and should not be seen as to limit the scope of the present invention.

Figure 18:
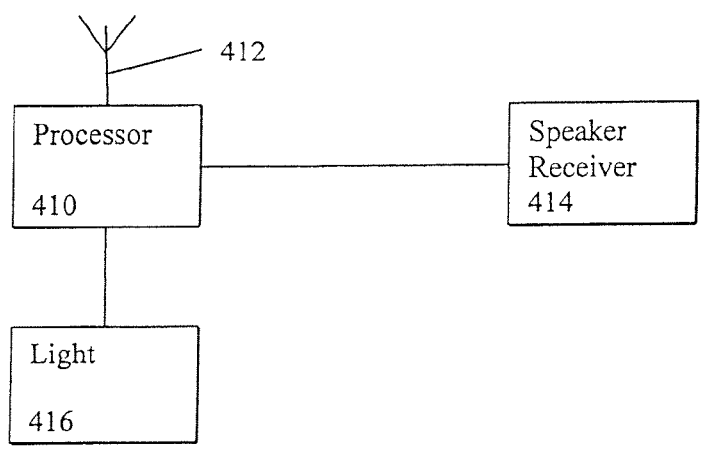
FIG. 18 is a simplified functional block diagram of the location device used in the present invention.

Referring to FIG. 18, a simplified block diagram of the locating device 408 is shown. The locating device 408 may have a processing unit 410. The processing unit 410 may be a GPS receiver module or the like. The processing unit 410 may have an antenna 412. The antenna 412 may be used to send and or receive signals to and from the locating device. The antenna 412 may be used to receive location signals that have been transmitted. The processing unit 410 may use these transmitted signals to calculate a location of the locating device 412. The antenna 412 may further be used to send out location information calculated by the processing unit 410 so that an owner having a program loaded on a mobile phone may locate the locating device 412. The processing unit 410 may have an audible or visual signal indicator such as a speaker/receiver 414, a light 416 or the like to aid an owner in locating the locating device 408. As stated above, in accordance with one embodiment, if an owner claps his/her hands or say and or yell a code word, upon the speaker/receiver 414 hearing the hand clap or code word, the processing unit 410 will then send an audible signal through the speaker/receiver 414 or flash the light 416.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. An apparatus for holding an object comprising:
   a holding piece for holding the object; and
   a locating device coupled to the holding piece, wherein the locating device comprises:
   a processor to calculate a location of the locating device; and
   an antenna coupled to the processor to send and receive signals.

2. An apparatus for holding an object in accordance with claim 1 further comprising a housing attached to the holding piece, the locating device positioned in a void formed in the housing.

3. An apparatus for holding an object in accordance with claim 1 further comprising identifying indicia formed on a front face of the housing.

4. An apparatus for holding an object in accordance with claim 2 wherein the housing attaches to a cell phone holder.

5. An apparatus for holding an object in accordance with claim 1 wherein the locating device further comprises:
   a speaker/receiver coupled to the processor to send and receive audible signals; and
   a light coupled to the processor to provide a visual signal.

6. An apparatus for holding an object in accordance with claim 5 wherein the speaker/receiver will receive a predetermined first audible signal and the processor will send a second audible signal in response, the second audible signal used to locate the apparatus.

7. An apparatus for holding an object in accordance with claim 1 wherein the holding piece comprises an elongated piece of material having a first end and a second end, the material folded so that the second end is slight above and approximately touching the first end.

8. An apparatus for holding an object in accordance with claim 7 wherein the holding piece further comprises a lip formed on the second end.

9. An apparatus for holding an object comprising:
a holding piece for holding the object;
a housing having a void space, the housing attached to the holding piece; and
a locating device positioned in the void space, the locating device activated when receiving a predetermined signal and transmitting location signals, wherein the locating device comprises:
a processor to calculate a location of the locating device; and
an antenna coupled to the processor receive predetermined signals and transmit location signals.

10. An apparatus for holding an object in accordance with claim 9 further comprising identifying indicia formed on a front face of the housing.

11. An apparatus for holding an object in accordance with claim 9 wherein the housing attaches to a cell phone holder.

12. An apparatus for holding an object in accordance with claim 9 wherein the locating device further comprises:
a speaker/receiver coupled to the processor to send and receive audible signals; and
a light coupled to the processor to provide a visual signal.

13. An apparatus for holding an object in accordance with claim 12 wherein the speaker/receiver will receive a predetermined first audible signal and the processor will send a second audible signal in response, the second audible signal used to locate the apparatus.

14. An apparatus for holding an object in accordance with claim 9 wherein the holding piece comprises an elongated piece of material having a first end and a second end, the material folded so that the second end is slight above and approximately touching the first end.

15. An apparatus for holding an object in accordance with claim 14 wherein the holding piece further comprises a lip formed on the second end.

16. An apparatus for holding an object comprising:
a holding piece for holding the object;
a housing having a void space, the housing attached to the holding piece;
identifying indicia formed on a front face of the housing; and
a locating device positioned in the void space, the locating device activated when receiving a predetermined signal and transmitting location signals;
wherein the locating device comprises:
a processor to calculate a location of the locating device; and
an antenna coupled to the processor receive predetermined signals and transmit location signals.

17. An apparatus for holding an object in accordance with claim 16 wherein the holding piece comprises an elongated piece of material having a first end and a second end, the material folded so that the second end is slight above and approximately touching the first end, a lip formed on the second end.

18. An apparatus for holding an object in accordance with claim 16 wherein the locating device further comprises:
a speaker/receiver coupled to the processor to send and receive audible signals; and
a light coupled to the processor to provide a visual signal;
wherein the speaker/receiver will receive a predetermined first audible signal and the processor will send a second audible signal in response, the second audible signal used to locate the apparatus.

\* \* \* \* \*